(12) United States Patent
Song et al.

(10) Patent No.: US 7,140,031 B2
(45) Date of Patent: Nov. 21, 2006

(54) OPTICAL DISC LOADING APPARATUS

(75) Inventors: In-Sang Song, Ulwang-Si (KR); Seung-Hon Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/537,404

(22) PCT Filed: Jun. 4, 2003

(86) PCT No.: PCT/KR03/01100

§ 371 (c)(1),
(2), (4) Date: Jun. 1, 2005

(87) PCT Pub. No.: WO2004/051643

PCT Pub. Date: Jun. 17, 2004

(65) Prior Publication Data

US 2005/0289563 A1    Dec. 29, 2005

(30) Foreign Application Priority Data

Dec. 2, 2002   (KR)  ............... 10-2002-0075989
Dec. 16, 2002  (KR)  ............... 10-2002-0080477

(51) Int. Cl.
*G11B 33/02*   (2006.01)

(52) U.S. Cl. .................................... 720/656
(58) Field of Classification Search ............... 720/656, 720/659, 619; 369/77.1, 77.2
See application file for complete search history.

(56) References Cited

U.S. PATENT DOCUMENTS 6,411,582 B1 * 6/2002 Nakatani et al. ............ 720/620

* cited by examiner

*Primary Examiner*—Hoa T. Nguyen
*Assistant Examiner*—Mark Blouin
(74) *Attorney, Agent, or Firm*—Lee, Hong, Degerman, Kang & Schmadeka

(57) ABSTRACT

In an optical loading apparatus, by including a main roller installed at an inlet side of an optical disc drive; a disc guide installed in the opposite direction of the main roller with an inserted disc therebetween; a disc path control member which can change disc path; a small disc stopping member formed at the drive in order to make an inserted small disc stop at a position mountable onto a spindle; and a large disc stopping member formed at the drive in order to make an inserted large disc stop at a position mountable onto a spindle, it is possible to reduce a fabrication cost by reducing the number of parts by simplifying a structure, and accordingly different-sized optical discs can be reliably loaded.

22 Claims, 16 Drawing Sheets

OPTICAL DISC LOADING APPARATUS

TECHNICAL FIELD

The present invention relates to an optical disc player using a slot loading method, and in particular to an optical disc loading apparatus capable of loading different-sized optical discs with the small number of parts.

BACKGROUND ART

Generally, an optical disc loading apparatus is largely divided into a tray transfer type and a slot loading type. In the slot loading type, not by mounting a disc onto a tray and transferring to a disc driver, but by inserting a disc into a slot and transferring it, the disc can be played. Accordingly, in the slot loading type, it is difficult to coincide the disc with a center of a spindle motor in comparison with the tray transferring type.

In addition, there are an optical disc having a diameter of 12 cm and an optical disc having a diameter of 8 cm, and accordingly an optical disc reproducing apparatus has to be possible to load various size-discs onto a spindle accurately.

In the conventional tray transferring type, a 12 cm disc mounting portion and a 8 cm disc mounting portion can be easily distinguished from each other by forming a stepped portion. However, in the slot loading type, it is difficult to distinguish a size of an inserted disc and load it.

In order to solve the above-mentioned problem, various optical disc loading apparatus have been developed, Japan patent application No.2000-227417 and Korea patent application No.2002-6312, etc. are related to them.

However, in the conventional optical disc loading apparatus, because a large quantity of parts are used in order to distinguish and load different-sized discs, lots of fabrication cost and fabrication time are consumed. In addition, operation reliability is lowered.

TECHNICAL GIST OF THE PESENT INVENTION

In order to solve the above-described problems, it is an object of the present invention to provide an optical disc loading apparatus capable of reducing the number of parts by simplifying a structure, lowering a fabrication cost and loading a different-sized disc reliably.

In order to achieve the above-mentioned objects, an optical disc loading apparatus in accordance with the present invention includes a main roller installed at an inlet side of an optical disc drive in order to take in/out an optical disc; a disc guide installed in the opposite direction of the main roller with an inserted disc therebetween; a disc path control member installed between the main roller and the inlet side of the drive; a small disc stopping member formed at the drive in order to make an inserted small disc stop at a position mountable onto a spindle; and a large disc stopping member formed at the drive in order to make an inserted large disc stop at a position mountable onto a spindle; wherein the disc path control member is formed so that an inserted disc contacting to the main roller, the disc guide and the path control member simultaneously has a proceeding direction different from that of an inserted disc contacting to the main roller, the disc guide simultaneously; the small disc stopping member has a certain height in order to stop a disc proceeding while simultaneously contacting to the main roller and the disc guide, and in order not to stop a disc proceeding while simultaneously contacting to the main roller, the disc guide and the path control member; and the large disc stopping member has a certain height in order to lock a disc proceeding while simultaneously contacting to the main roller, the disc guide and the path control member.

Accordingly, in the present invention, by having a structure capable of varying a proceeding path of a disc according to a kind of an inserted disc with the small-number of parts, it is possible to load a disc stably.

In addition, it is preferable for the disc path control member to have a sub roller installed at the end contacting to an inserted disc. Accordingly, an disc can be smoothly inserted without being scratched by the disc path control member.

And, the sub roller has a hyperboloid shape so as to contact only with the outer circumference of an optical disc, and accordingly it is possible to protect a data storing region of a disc from scratch.

In addition, the apparatus further includes a roller frame, at which the main roller is hinge-joined at the end and the disc path control member is formed at the other end, rotationally hinge-joined with the main frame of the optical disc drive. The end of the roller frame at which the disc path control member is installed is bended in order to close the drive inlet when the main roller is separated from an inserted disc. In more detail, when the disc loading is finished and the roller frame is rotated so as to be separated from the inserted disc, the disc path control member closes the inlet of the disc drive, and accordingly it is possible to prevent duplicated disc insertion.

In addition, the disc path control member includes a cleaning means at a surface contacted to an inserted disc, and accordingly it is possible to remove impurities on a data storing region of the disc.

And, each contact rib has a different height in order to make an inserted optical disc be stopped completely in the small disc stopping member.

In the meantime, as another embodiment of the present invention, an optical disc loading apparatus includes a roller frame hinge-joined with a main frame; a main roller rotationally connected with the end of the roller frame; a roller driving means for rotating the main roller; a sub member installed so as to support the same surface of an inserted optical disc with the main roller; a contact-pressing means for pressing the optical disc toward the main roller in order to make the inserted optical disc contact to the main roller with a contact-pressing force; at least two small disc stopping members formed at the main frame contacted to the outer circumference of an inserted small disc in order to stop the inserted small disc at a position mountable onto a spindle; at least two large disc stopping members formed at the main frame contacted to the outer circumference of an inserted large disc in order to stop the inserted large disc at a position mountable onto a spindle; a large disc distinguishing means for distinguishing an inserted large disc; and a roller frame driving means for rotating the roller frame in order to make the large disc inserted by the distinguishing means not to be stopped to the small disc stopping member.

And, the roller frame includes a main roller arm for connected with the main roller; and a sub member arm formed at the opposite end of the main roller arm and having the sub member; wherein the main roller arm and the sub member arm are formed so that the hinge point of the roller frame is formed on a straight line of the top surfaces of the main roller and the sub member.

In addition, the contact-pressing means includes a hinge protrusion projected from the main frame, at which the bottom end thereof is placed at the hinge point of the roller frame, in order to contact-press the inserted optical disc toward the main roller and the sub member; and a roller frame elastic member, at which the end is fixed to the roller frame and the other end is fixed to the mainframe, for contact-pressing the main roller-inserted optical disc.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a plan view illustrating an optical disc loading apparatus in inserting of a small disc;

FIG. 2 is a side view illustrating the optical disc loading apparatus when the inserted small disc is located at position II in FIG. 1;

FIG. 3 is a side view illustrating the optical disc loading apparatus when the inserted small disc is located at position III in FIG. 1;

FIG. 4 is a side view illustrating the optical disc loading apparatus when the inserted small disc is located at position IV in FIG. 1;

FIG. 5 is a side view illustrating the optical disc loading apparatus when the inserted small disc is located at position V in FIG. 1;

FIG. 6 is a side view illustrating the optical disc loading apparatus when the inserted small disc is located at position VI in FIG. 1;

FIG. 7 is a plan view illustrating the optical disc loading apparatus when a large disc is inserted;

FIG. 8 is a side view illustrating the optical disc loading apparatus when the inserted large disc is located at position VIII in FIG. 7;

FIG. 9 is a side view illustrating the optical disc loading apparatus when the inserted large disc is located at position IX in FIG. 7;

FIG. 10 is a side view illustrating the optical disc loading apparatus when the inserted large disc is located at position X in FIG. 7;

FIG. 11 is a side view illustrating the optical disc loading apparatus when the inserted large disc is located at position XI in FIG. 7;

FIG. 12 is a perspective view illustrating a disc guide;

FIG. 13 is a sectional view taken along a line XIII—XIII in FIG. 12;

FIG. 18 is a plan view illustrating the optical disc loading apparatus in inserting of a large disc;

FIG. 19 is a side view illustrating a large disc cam member in FIG. 18;

FIG. 20 is a side view illustrating a small disc cam member in FIG. 18;

FIG. 21 is a side view illustrating the optical disc loading apparatus in FIG. 18 when a large disc cam locking protrusion in FIG. 18 is located at a position IIX I;

FIG. 22 is a side view illustrating the optical disc loading apparatus in FIG. 18 when the large disc cam locking protrusion in FIG. 19 is located at a position IIX II;

FIG. 23 is a side view illustrating the optical disc loading apparatus in FIG. 18 when the large disc cam locking protrusion in FIG. 19 is located at a position IIX III;

FIG. 24 is a plan view illustrating the optical disc loading apparatus in inserting of a small disc;

FIG. 25 is a side view illustrating the optical disc loading apparatus in FIG. 24 when the small disc cam locking protrusion in FIG. 20 is located at a position IIX V;

FIG. 26 is a side view illustrating the optical disc loading apparatus when the small disc in FIG. 24 contacts to a trigger protrusion;

FIG. 27 is a side view illustrating the optical disc loading apparatus in FIG. 24 when the small disc cam locking protrusion in FIG. 20 is located at a position IIX VII;

FIG. 28 is a perspective view illustrating a disc guide in FIG. 21;

FIG. 29 is a sectional view taken along a line IIX IX–II X IX;

DETAILED DESCRIPTION OF THE INVENTION

Hereinafter, the preferred embodiments of the present invention will be described with reference to accompanying drawings.

In description of the present invention, detailed explanation about functions and a construction of the conventional art may be abridged in order not to wander from the gist of the present invention.

Figure 1:
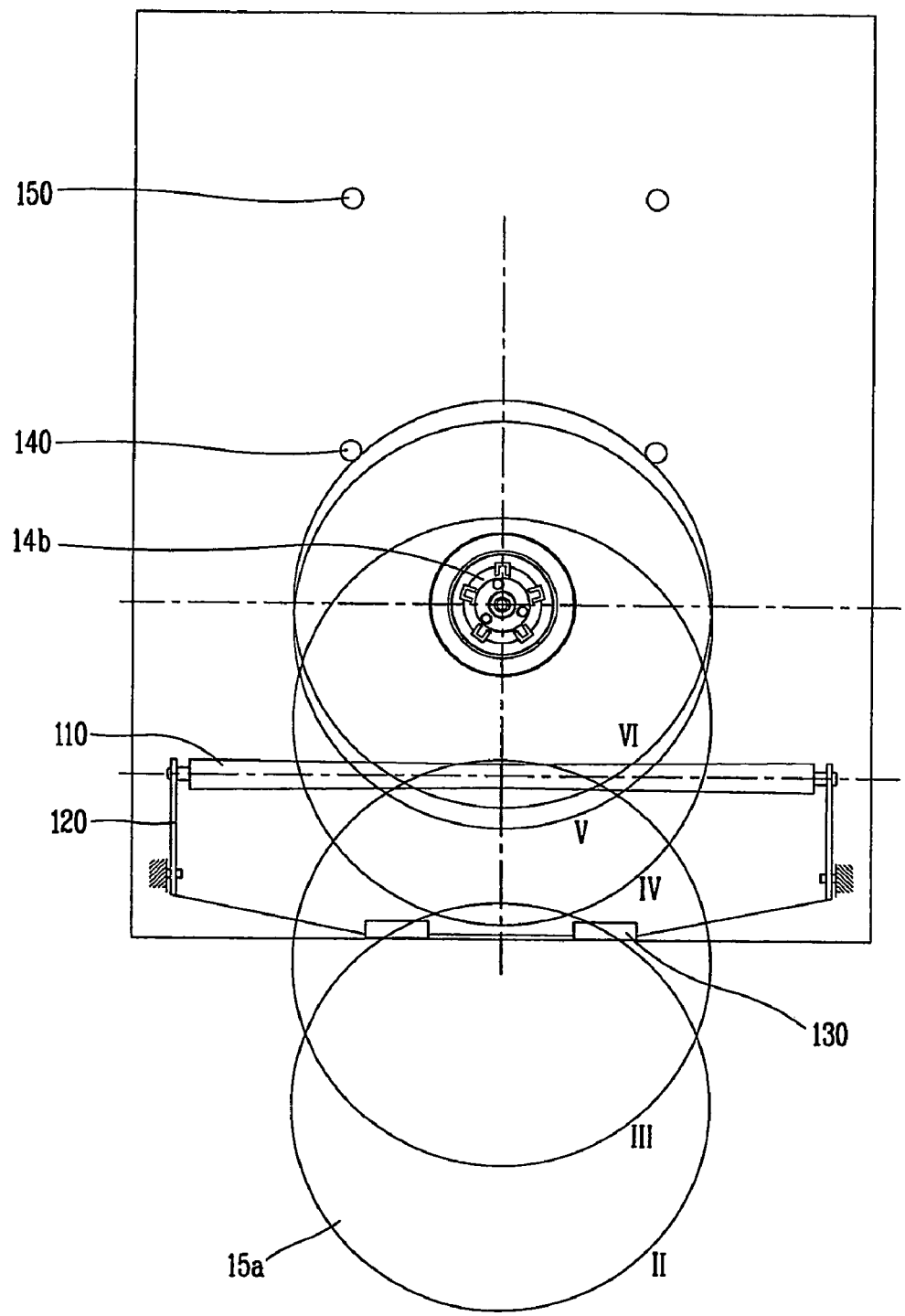
FIGS. 1~13 show an optical disc loading apparatus in accordance with a first embodiment of the present invention.
Figure 2:
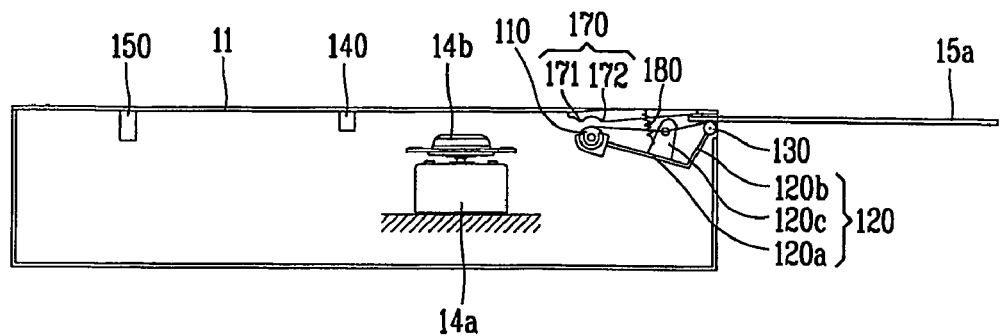
Figure 3:
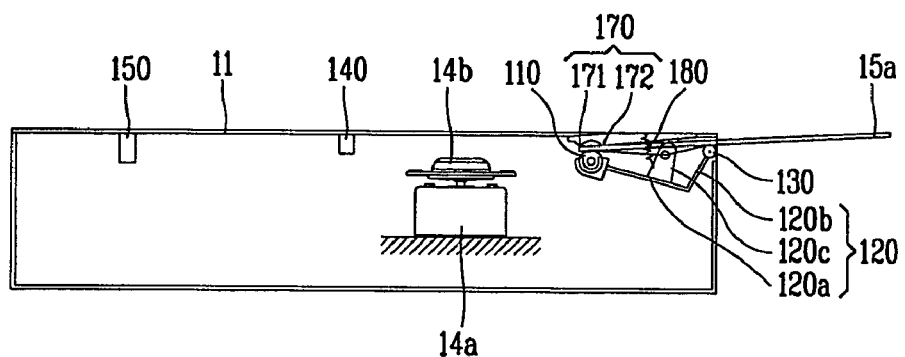
Figure 4:
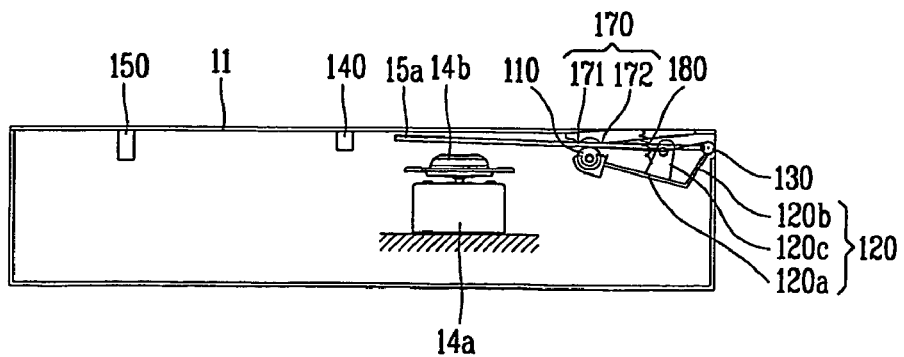
Figure 5:
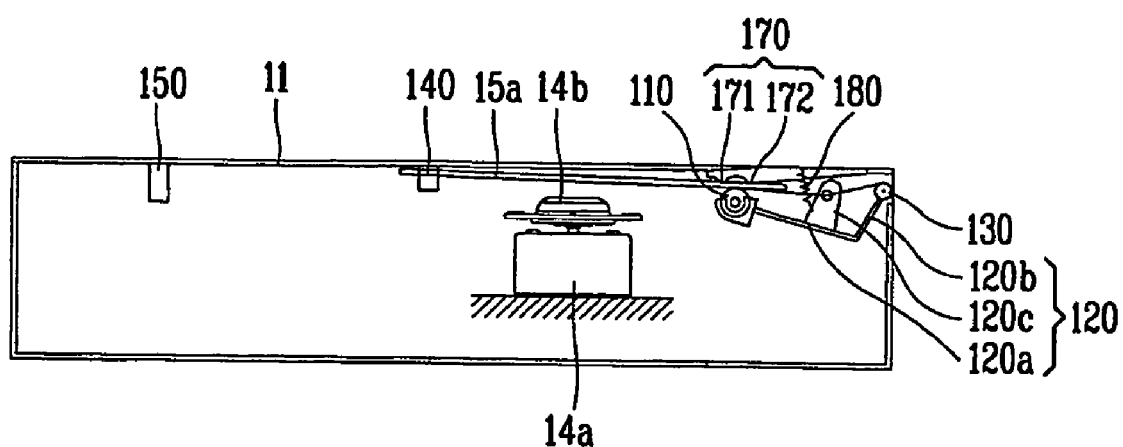
Figure 6:
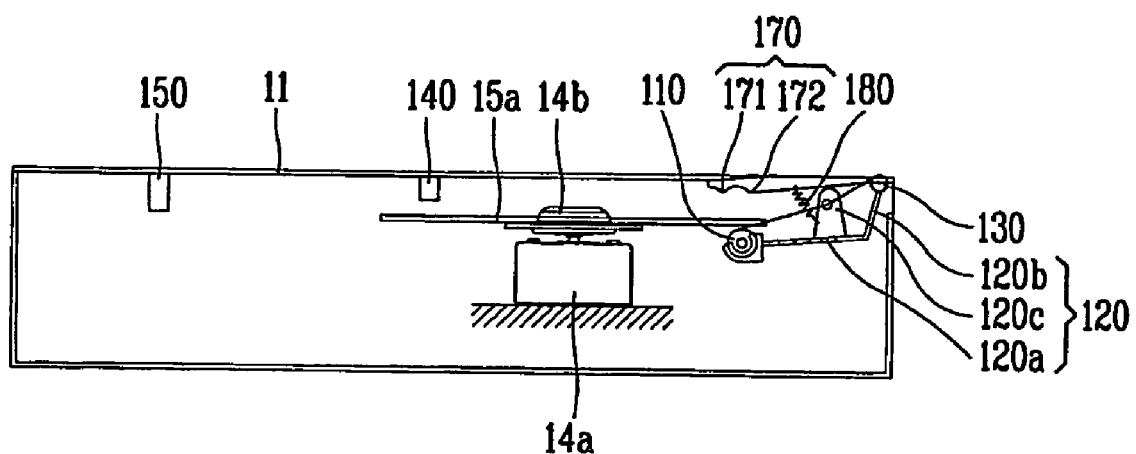
Figure 7:
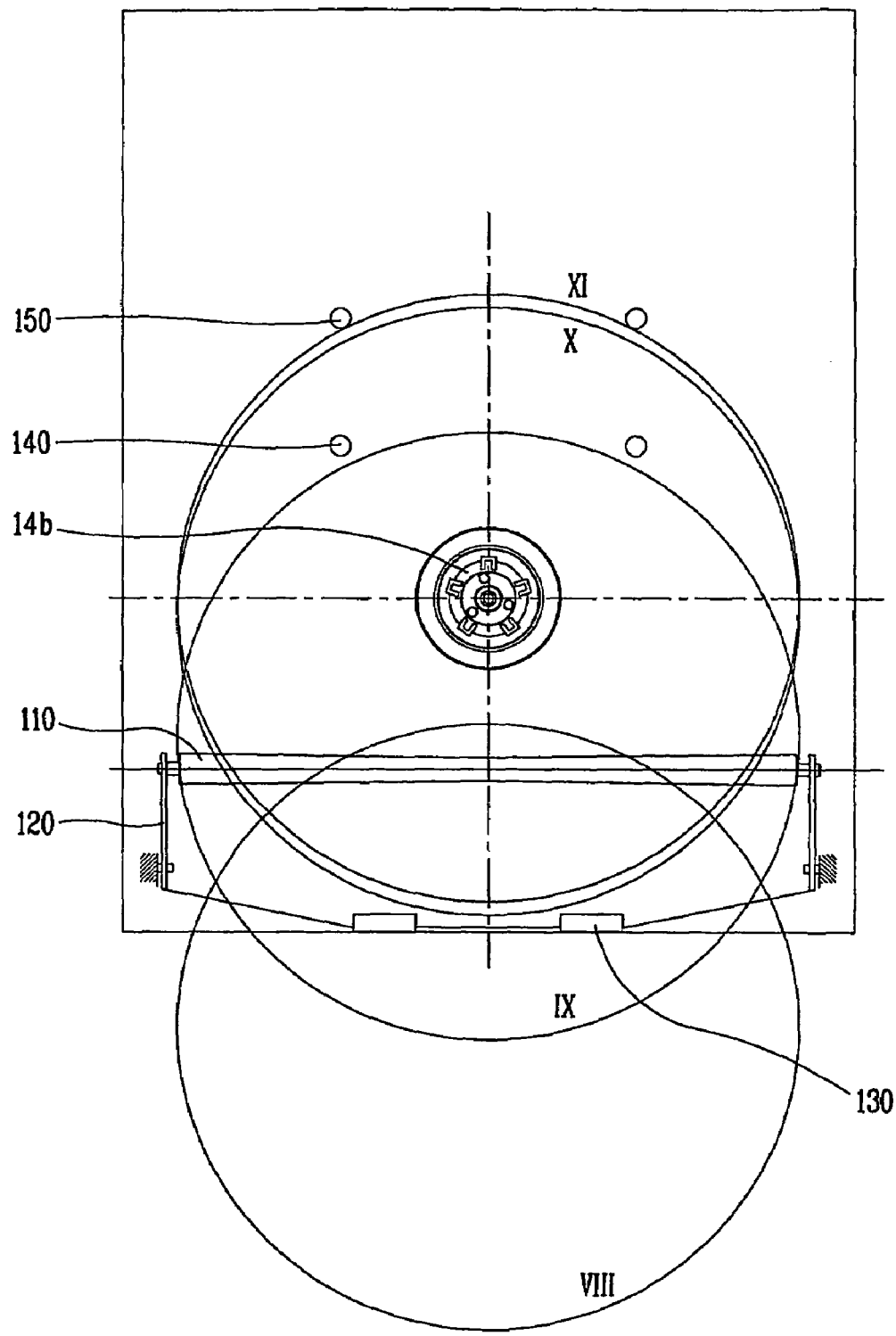
Figure 8:
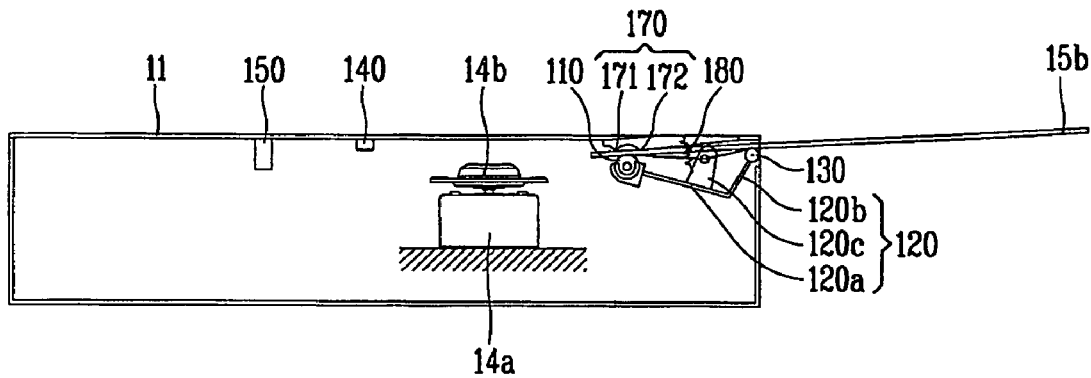
Figure 9:
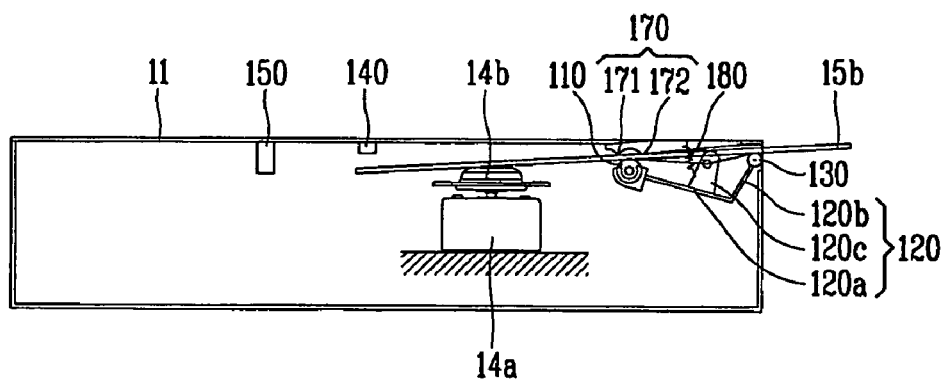
Figure 10:
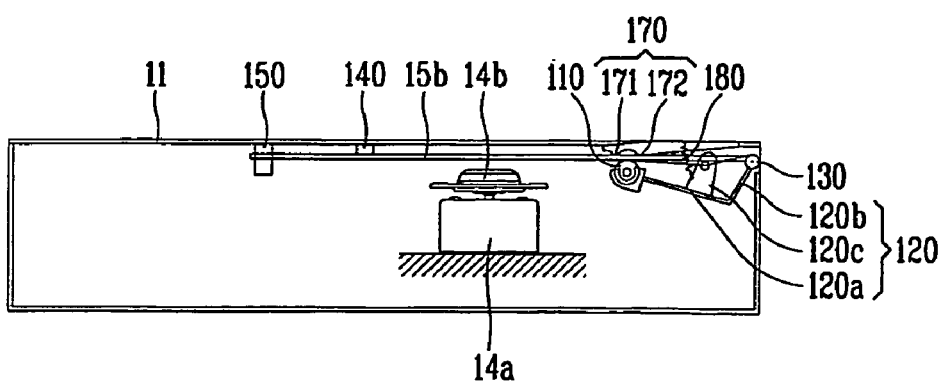
Figure 11:
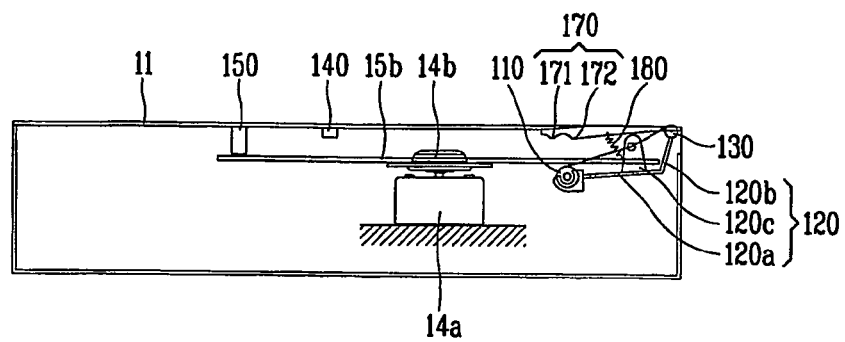
Figure 12:
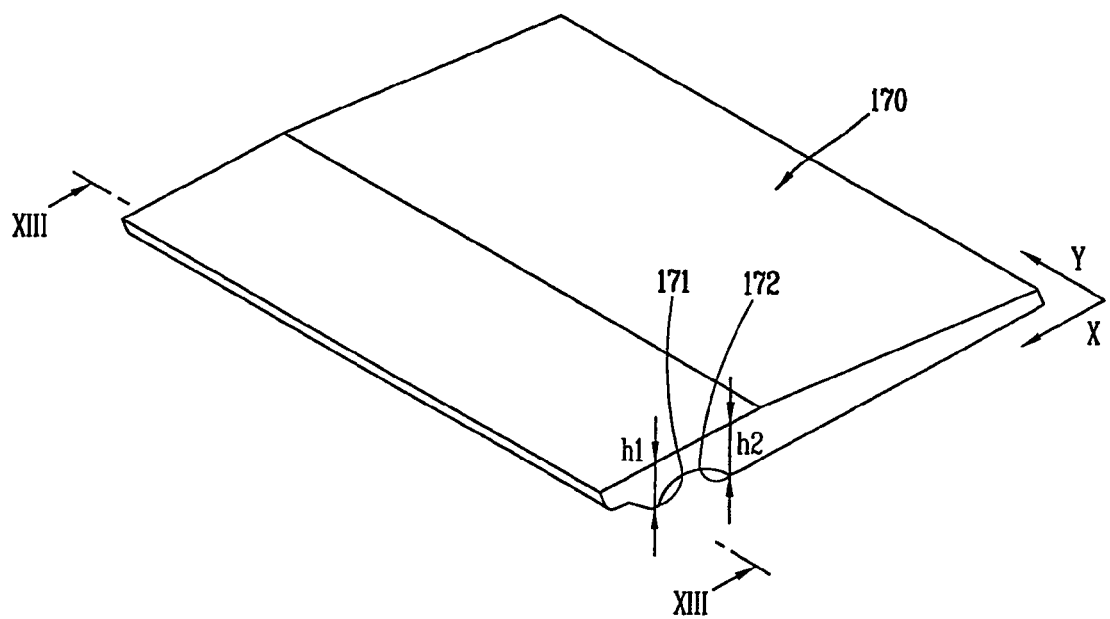
Figure 13:
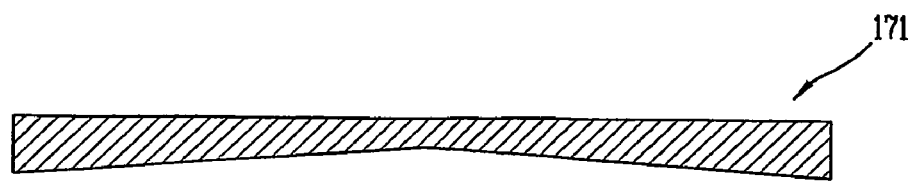

FIGS. 1~13 show an optical disc loading apparatus in accordance with a first embodiment of the present invention; FIG. 1 is a plan view illustrating an optical disc loading apparatus in inserting of a small disc; FIG. 2 is a side view illustrating the optical disc loading apparatus when the inserted small disc is located at position II in FIG. 1; FIG. 3 is a side view illustrating the optical disc loading apparatus when the inserted small disc is located at position III in FIG. 1; FIG. 4 is a side view illustrating the optical disc loading apparatus when the inserted small disc is located at position IV in FIG. 1; FIG. 5 is a side view illustrating the optical disc loading apparatus when the inserted small disc is located at position V in FIG. 1; FIG. 6 is a side view illustrating the optical disc loading apparatus when the inserted small disc is located at position VI in FIG. 1; FIG. 7 is a plan view illustrating the optical disc loading apparatus when a large disc is inserted; FIG. 8 is a side view illustrating the optical disc loading apparatus when the inserted large disc is located at position VIII in FIG. 7; FIG. 9 is a side view illustrating the optical disc loading apparatus when the inserted large disc is located at position IX in FIG. 7; FIG. 10 is a side view illustrating the optical disc loading apparatus when the inserted large disc is located at position X in FIG. 7; FIG. 11 is a side view illustrating the optical disc loading apparatus when the inserted large disc is located at position XI in FIG. 7; FIG. 12 is a perspective view illustrating a disc guide; and FIG. 13 is a sectional view taken along a line XIII—XIII in FIG. 12.

As depicted in FIGS. 1~13, the optical disc loading apparatus in accordance with the first embodiment of the present invention is operated by an operating unit (not shown). It includes a main roller 110 installed at an inlet of an optical disc drive in order to get in/out an optical disc 15a, 15b; a disc guide 170 installed at the opposite of the main roller 110 on the basis of the inserted disc 15a, 15b; a disc path control member 130 installed toward the inlet; a small disc stopping member 140 formed at the drive in order to make the small disc 15a stop at a position mountable onto a spindle 14b; and a large disc stopping member 150 formed at the drive in order to make the inserted large disc 15b stop at a position mountable onto the spindle 14b.

The path control member 130 is formed so that a proceeding direction of an inserted disc simultaneously contacted to the main roller 110, the disc guide 170 and the path control member 130 is different from a proceeding direction of an inserted disc simultaneously contacted to the main roller 110 and the disc guide 170. The small disc stopping member 140 has a certain height so as to lock a disc proceeding while the disc contacting the main roller 110 and the disc guide 170 simultaneously, and so as not to lock a disc proceeding while the disc contacting the main roller 110, the disc guide 170 and the path control member 130 simultaneously. And, the large disc stopping member 150 has a certain height so as to lock a disc 15a, 15b proceeding while contacting the main roller 110, the disc guide 170 and the path control member 130 simultaneously.

The path control member 130 can be a sub roller for contacting to an optical disc surface while rotating. The sub roller 130 is a cylindrical roller and has a cleaning means at a surface contacted with the optical disc 15a, 15b in taking in/out of the disc 15a, 15b. The cleaning means is made of cotton flannel.

In addition, the main roller 110 and the sub roller 130 are respectively combined with the both ends of a roller frame 120 rotationally hinge-joined with a main frame 11 of the optical disc drive. The roller frame 120 includes a main roller arm 120a at which the main roller 110 is hinge-joined; a sub roller arm 120b at which the sub roller 130 is hinge-joined; and a hinge protrusion 120c hinge-joined with a main frame. The sub roller arm 120b is formed so as to close the disc inlet when the main roller 110 is separated from the optical disc by an additional main roller cam unit (not shown). In addition, as depicted in FIG. 9, in the roller frame 120, the main roller arm 120a and the sub roller arm 120b are formed in order to make the optical disc 15b proceed in a direction not locked in a small disc stopping member when the optical disc 15b is simultaneously contacted with the main roller 110 and the sub roller 130.

In addition, the roller frame 120 further includes a spring 180 at which an end is fixed to the roller frame 120 and the other end is fixed to the main frame 11 in order to make the disc 15 adhere closely to the disc guide 170.

The disc guide 170 includes two disc contact ribs 171, 172 facing the main roller 110. As depicted in FIG. 12, in forming of the contact ribs 171, 172, a height h1 is lower than a height h2. Because of that, as depicted in FIG. 4, when the disc is inserted between the contact ribs 171, 172 and the main roller 110, the disc can be stably locked in a small disk stopping member 140. However, the objects of the present invention can be achieved by forming the contact ribs 171, 172 so as to make the disc be locked in the small disk stopping member 140 when the disc is inserted between the contact ribs 171, 172 and the main roller 110. In addition, as depicted in FIGS. 12 and 13, the contact ribs 171, 172 of the disc guide 170 are formed so as to be slant downwardly from the central portion to the both ends in the Y direction in FIG. 12. Accordingly, they can contact only to the outer circumference of the disc by being corresponded to the main roller 110 slant upwardly from the central portion to the both ends.

Hereinafter, the operation of the apparatus in accordance with the first embodiment of the present invention will be described.

FIGS. 1~6 show the inserting operation of the small disc 15a.

When a user inserts the small (optical) disc 15a, the main roller 110 is operated by an optical disc insertion sensing unit (not shown) arranged at the inlet of the optical disc player, when the small disc 15a reaches the main roller 110, the small optical disc 15a can be inserted by the main roller 110. As depicted in FIG. 3, when the small disc 15a simultaneously contacts with the main roller 110, the sub roller 130 and the disc guide 170, the small disc 15a is proceeded in the direction not be locked by the small disk stopping member 140.

As depicted in FIG. 4, when the small disc 15a passes the sub roller 130. The proceeding path of the small disc 15a can be determined only by the disc guide 70 and the main roller 110. In more detail, by placing the small disc 15a between the contact ribs 171, 172 of the disc guide 170 and the main roller 110, the small disc 15a proceeds in a direction locked by the small disk stopping member 140.

As depicted in FIG. 5, the small disc 15a proceeds continually and is locked by the small disk stopping member 140, and accordingly the center thereof is arranged at the center of the spindle 14b.

As depicted in FIG. 6, the main roller 110 moves downwardly by a main roller cam unit (not shown), and the small disc 15a is mounted onto the spindle 14b. In addition, because the main roller 110 moves downwardly, the sub roller arm 120b closes the inlet of the disc drive and prevents overlapping disc-insertion.

FIGS. 7~11 show the inserting operation of the large disc.

When the user inserts the large (optical) disc 15b, the main roller 110 is operated by the optical disc insertion sensing unit (not shown) arranged at the inlet of the optical disc player, when the large disc 15b reaches the main roller 110, the large optical disc 15b can be inserted by the main roller 110. As depicted in FIG. 9, when the large disc 15b simultaneously contacts with the main roller 110, the sub roller 130 and the disc guide 170, the large disc 15b is proceeded in the direction not be locked by the small disk stopping member 140.

As depicted in FIG. 9, the large disc 15b proceeds continually, passes the small disk stopping member 140 and is locked in the large disk stopping member 150, and accordingly the center thereof is arranged at the center of the spindle 14b.

As depicted in FIG. 11, the main roller 110 moves downwardly by the main roller cam unit (not shown), and the large disc 15b is mounted onto the spindle 14b.

The main roller cam unit (not shown) can be constructed variously.

As described above, because the present invention is capable of distinguishing and mounting a different-sized disc with a simple structure, it is possible to reduce a fabrication cost, simplify the operation and improve the operation reliability.

In addition, because the sub roller is made of cotton flannel, impurities on the surface of the optical disc can be removed.

Figure 14:
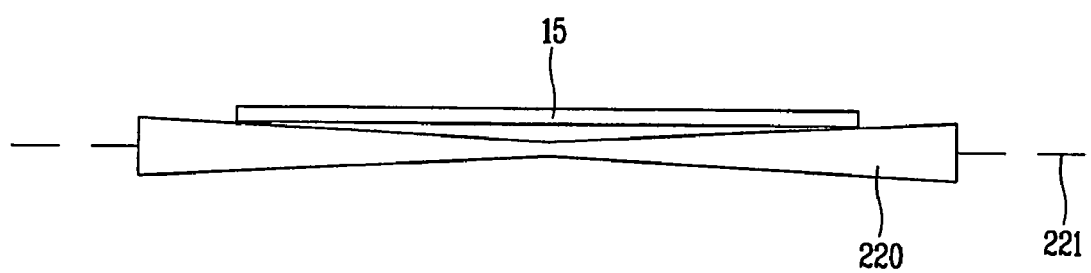
FIG. 14 is a front view illustrating a modified example of a sub roller in accordance with the first embodiment of the present invention.

FIG. 14 is a front view illustrating a modified example of a sub roller in accordance with the first embodiment of the present invention.

In a sub roller 220, a rotational shaft 221 is rotationally combined with the roller frame, and it is formed so as to be slant upwardly from the center to the both ends. Accordingly, in contacting of the optical disc 15, because it contacts to only the outer side of the optical disc 15, it is possible to minimize damage occurrable onto a data recording surface of the optical disc 15.

Figure 15:
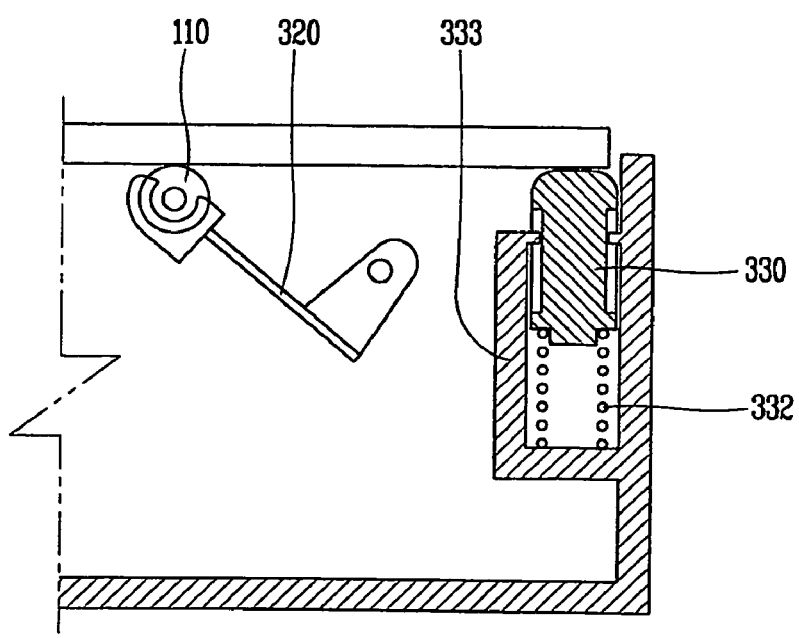
FIG. 15 is a side-sectional view illustrating a modified example of a disc path control member in accordance with the first embodiment of the present invention.

FIG. 15 is a side-sectional view illustrating a modified example of a disc path control member in accordance with the first embodiment of the present invention.

As depicted in FIG. 15, the disc path control member includes a spring receiving portion 333 formed at the optical disc drive main body 11; a spring 332 installed in the spring receiving portion 333; and a sub member 330 connected to the spring 332 and performing the up and down motion.

In addition, by fixing the sub member 330 at the optical disc drive main body 11, the objects of the present invention can be achieved.

Figure 16:
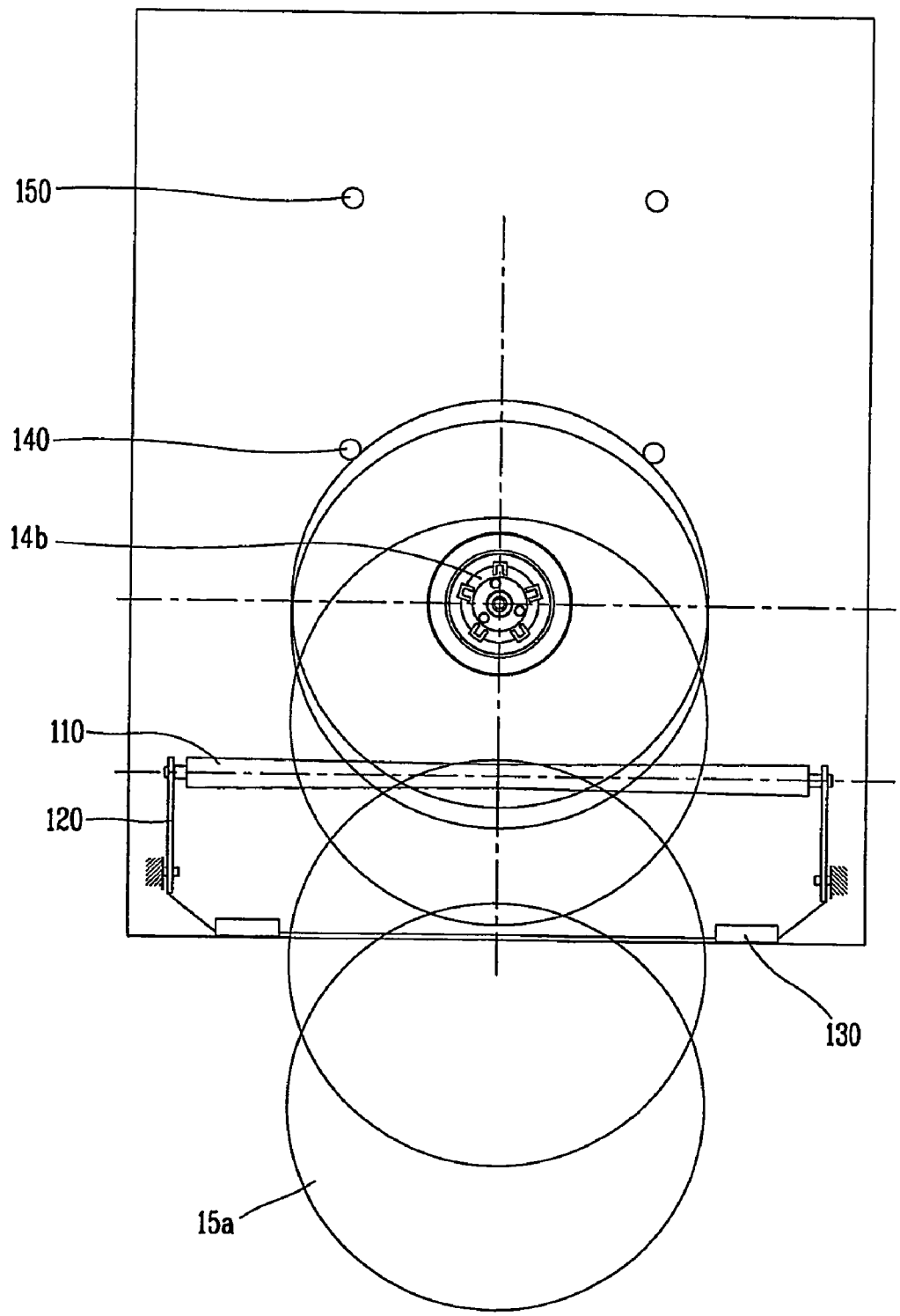
FIG. 16 is a plan view illustrating another example of a disc path control member in accordance with the first embodiment of the present invention.

FIG. 16 is a plan view illustrating another example of a disc path control member in accordance with the first embodiment of the present invention.

The optical disc path control member shown in FIG. 16 is installed at a position different from that of the optical disc path control member of the first embodiment. In more detail, it is installed at a position in which the small disc 15a does not contact in taking out and the large disc 15b contacts in taking in/out. Accordingly, by preventing the small disc 15a from being contacted to the path control member 130, it is possible to reduce damage occurrable risk of the small disc 15a.

Figure 17:
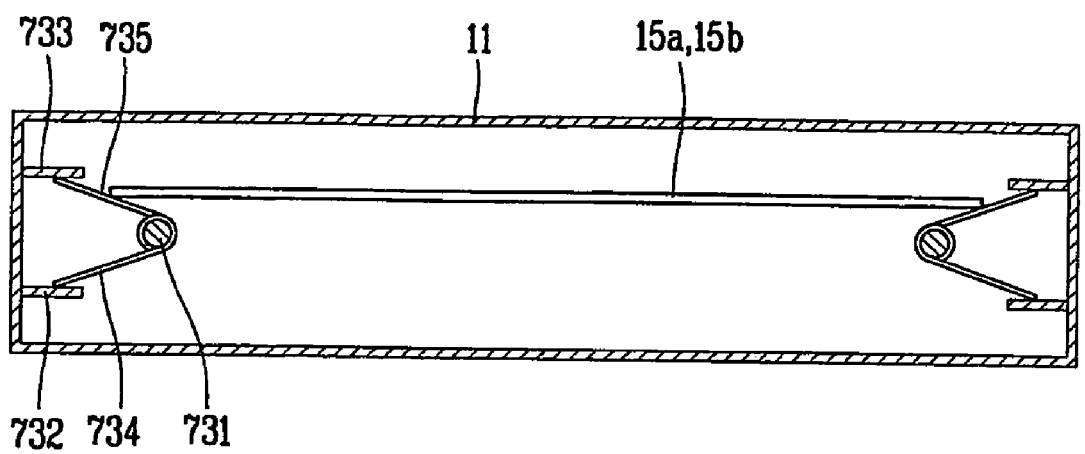
FIG. 17 is a front view illustration another example of a disc path control member in accordance with the first embodiment of the present invention.

FIG. 17 is a front view illustrating another example of a disc path control member in accordance with the first embodiment of the present invention.

The optical disc path control member shown in FIG. 17 comprised two torsion springs installed at disc inlet. Lower fixing plates 732 are formed at each interior sides of the main frame 11 and a upper stoppers 733 are formed above the lower fixing plates 732 at each interior sides of the main frame 11.

The bodies 731 of the torsion spring are facing each other. One end 734 of the torsion spring is fixed at the lower fixing plate 732 and the other end 735 of the torsion spring is limited by the upper stopper 733.

The disk 15a, 15b in contact with the end 735 of the torsion spring proceeds to a small disc locking member 140 and after passing the end 735 the disk 15a, 15b does not proceed to a small disc locking member 140.

Figure 18:
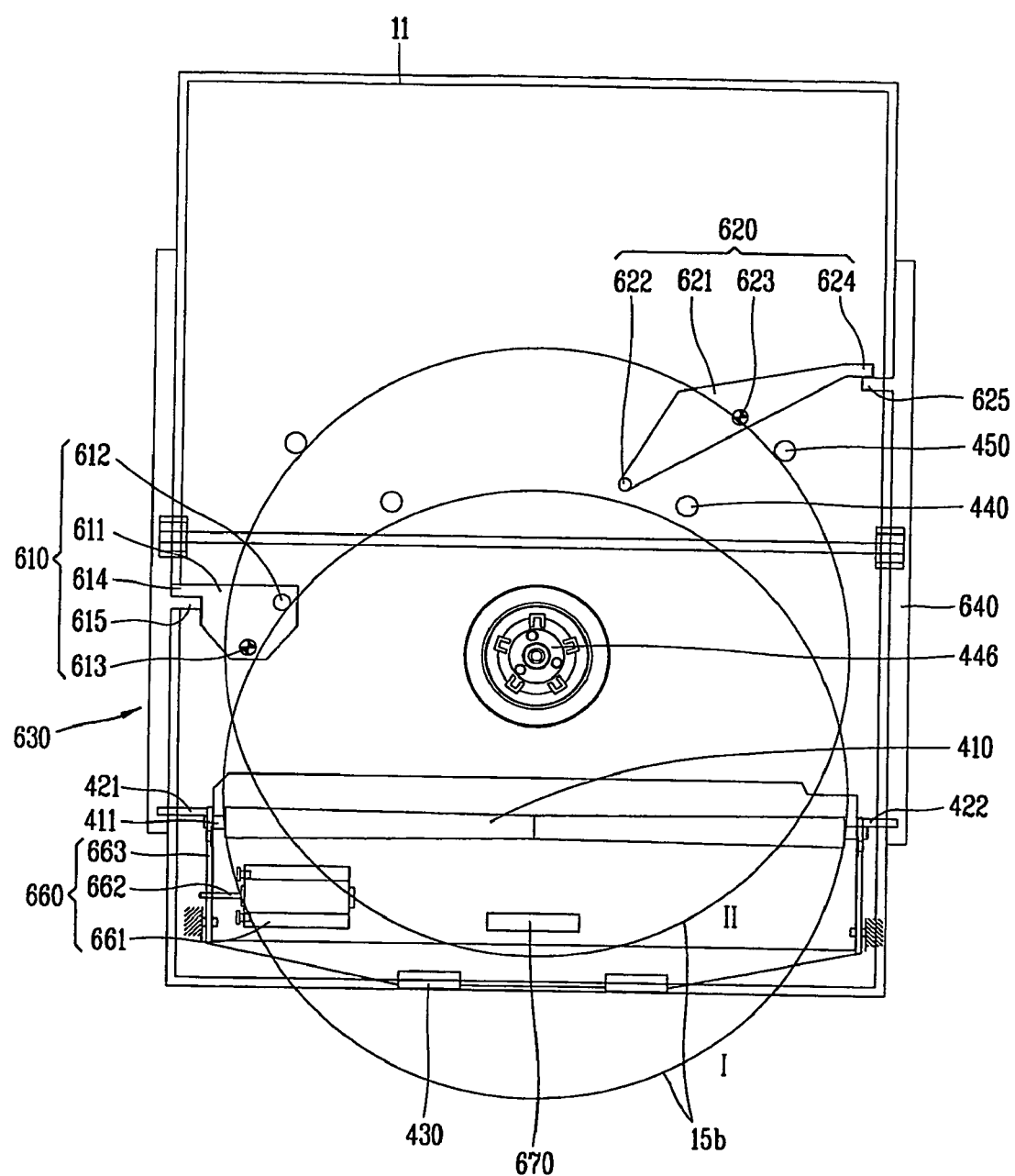
FIGS. 18~29 show an optical disc loading apparatus in accordance with a second embodiment of the present invention.
Figure 19:
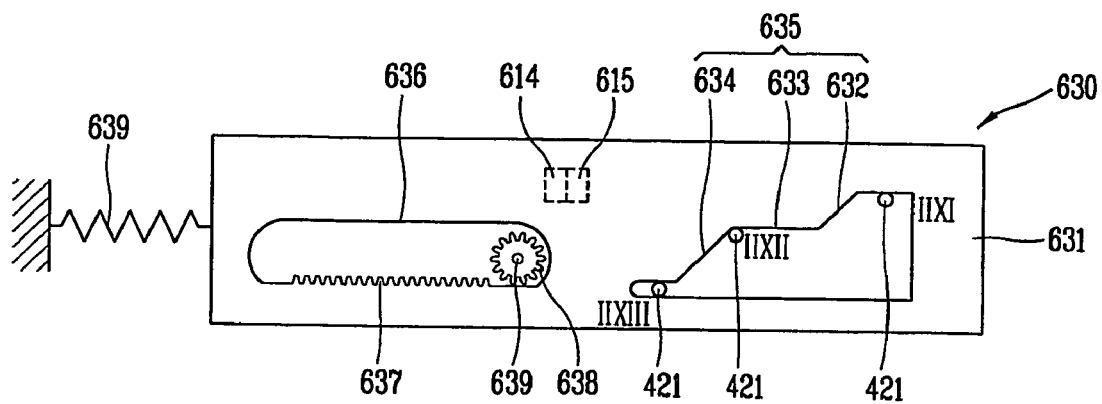
Figure 20:
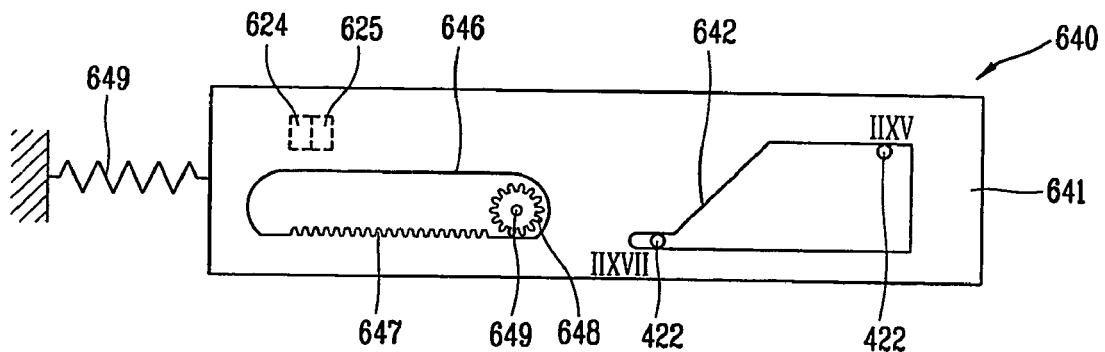
Figure 21:
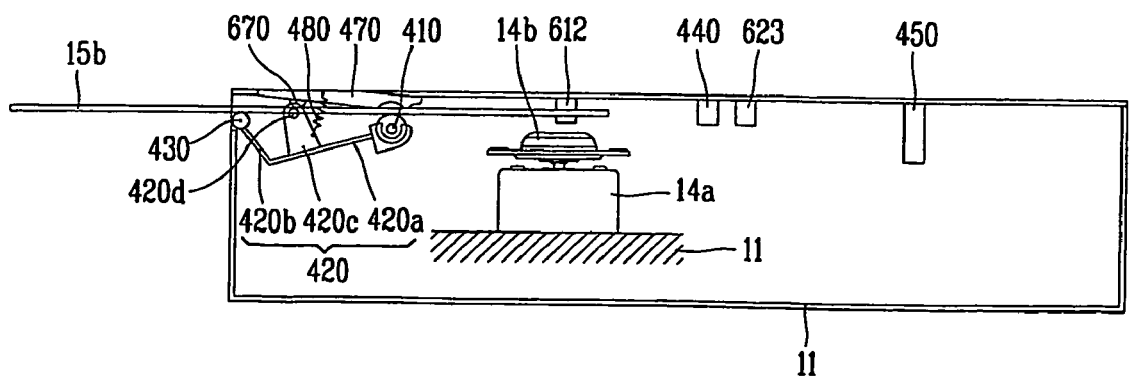
Figure 22:
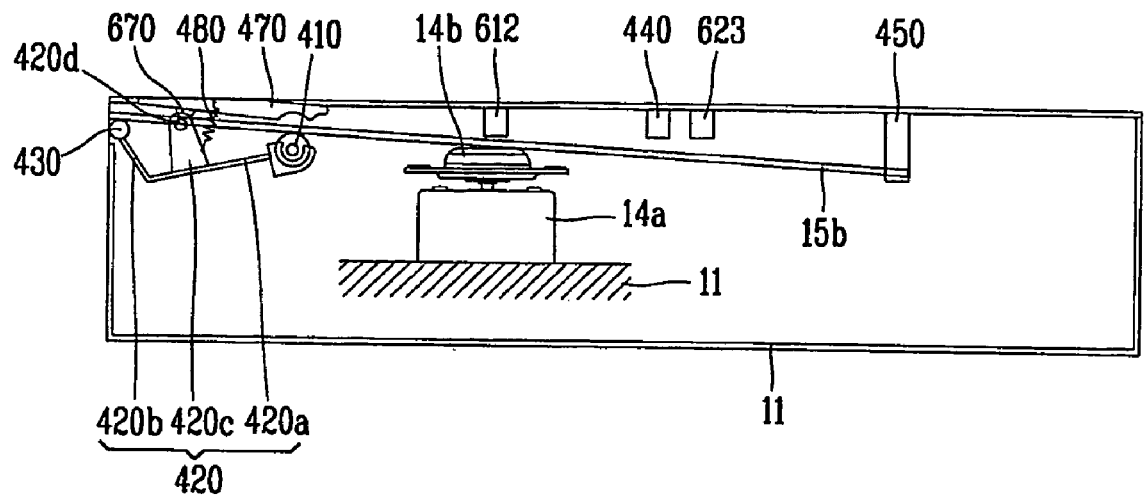
Figure 23:
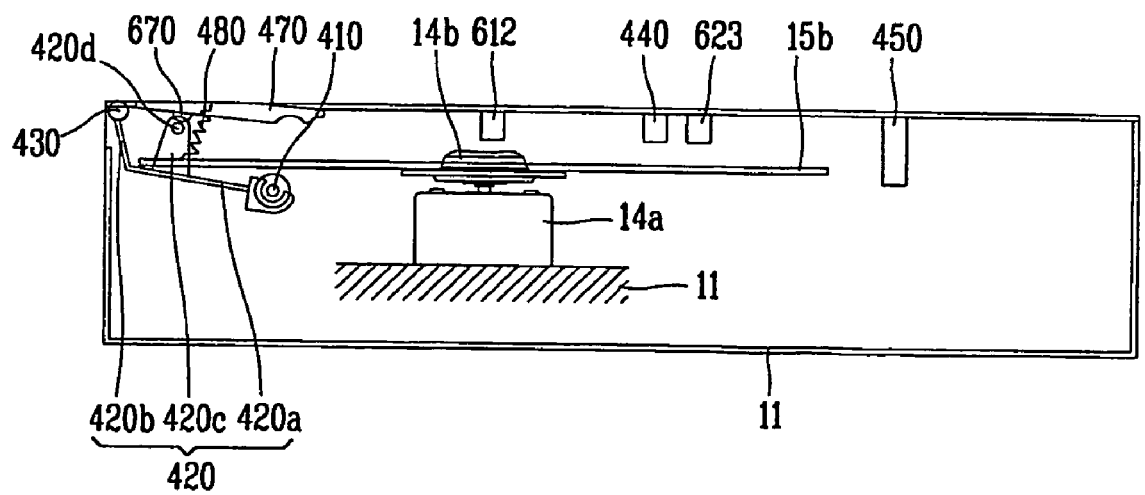
Figure 24:
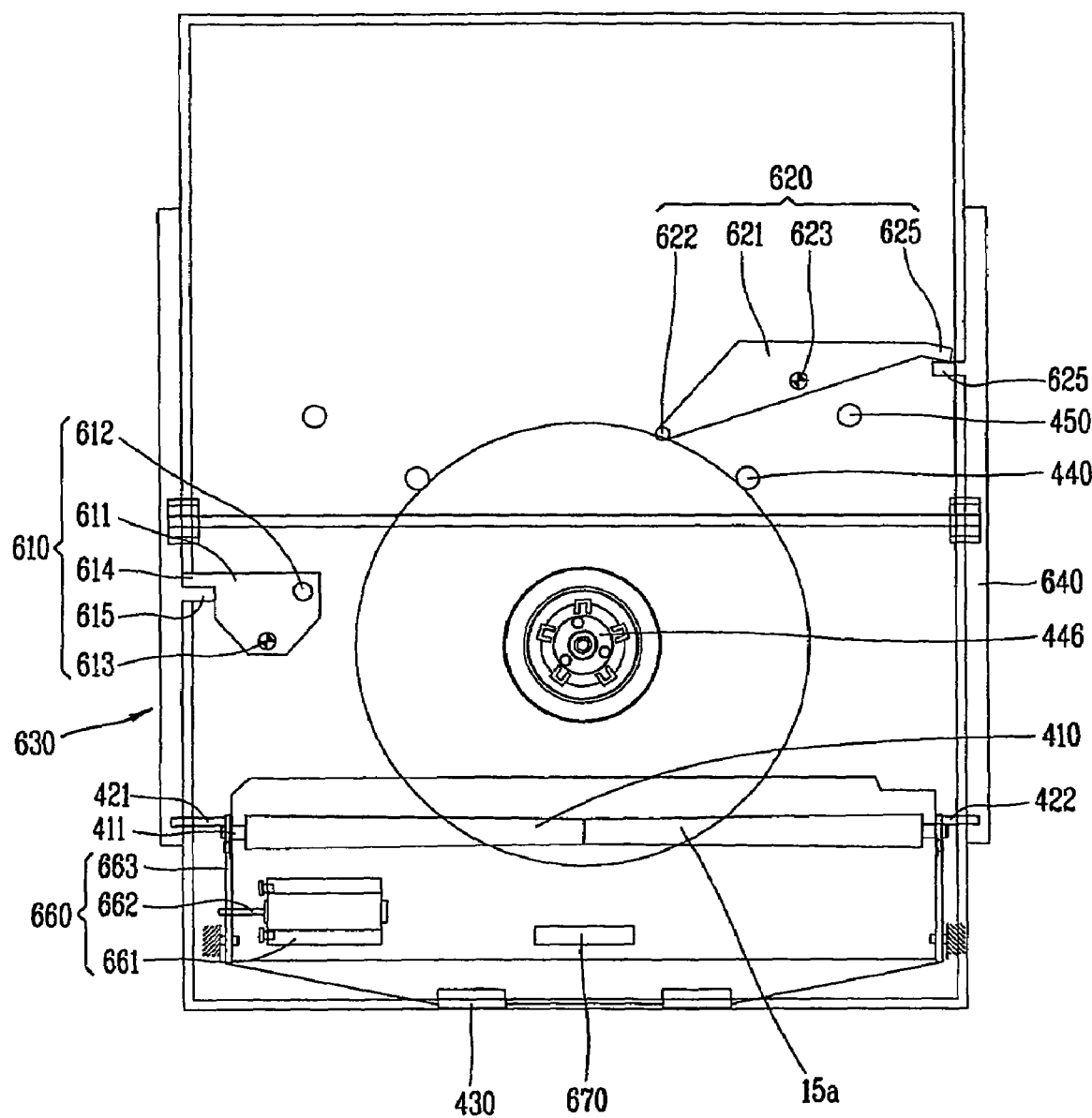
Figure 25:
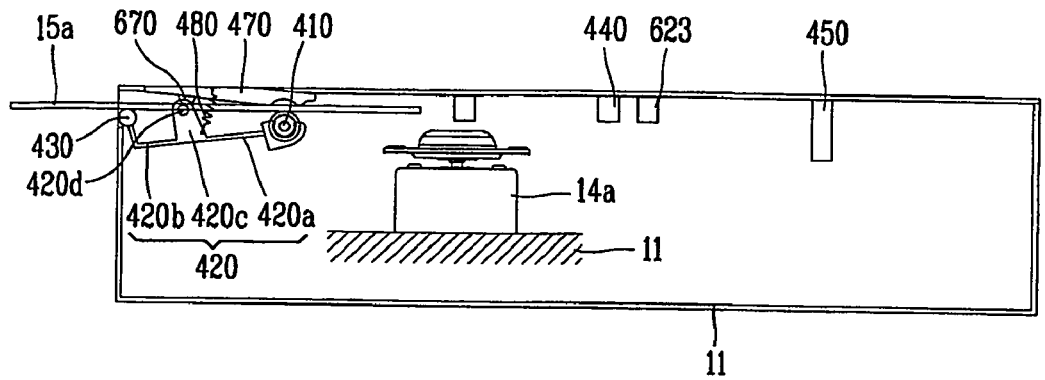
Figure 26:
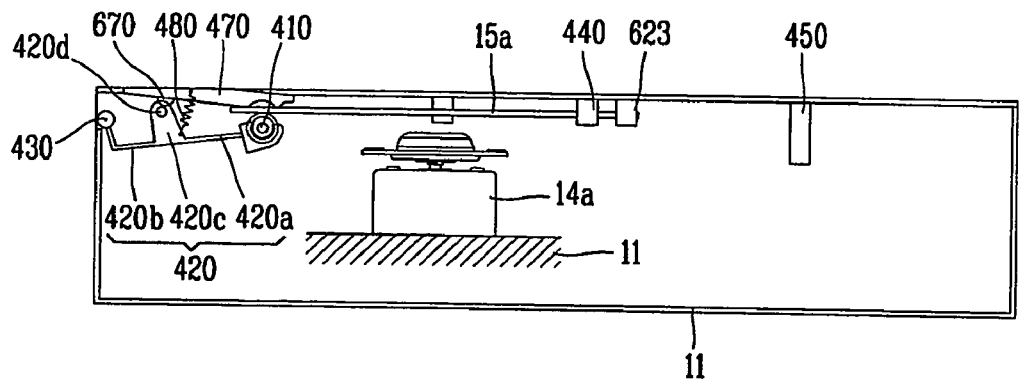
Figure 27:
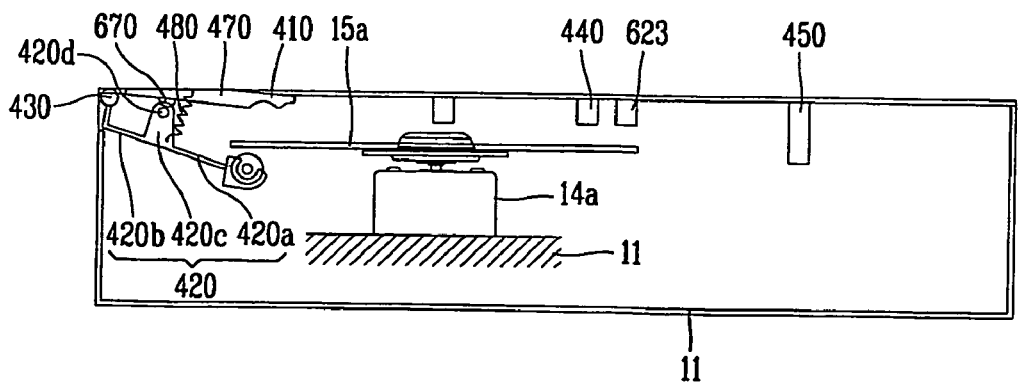
Figure 28:
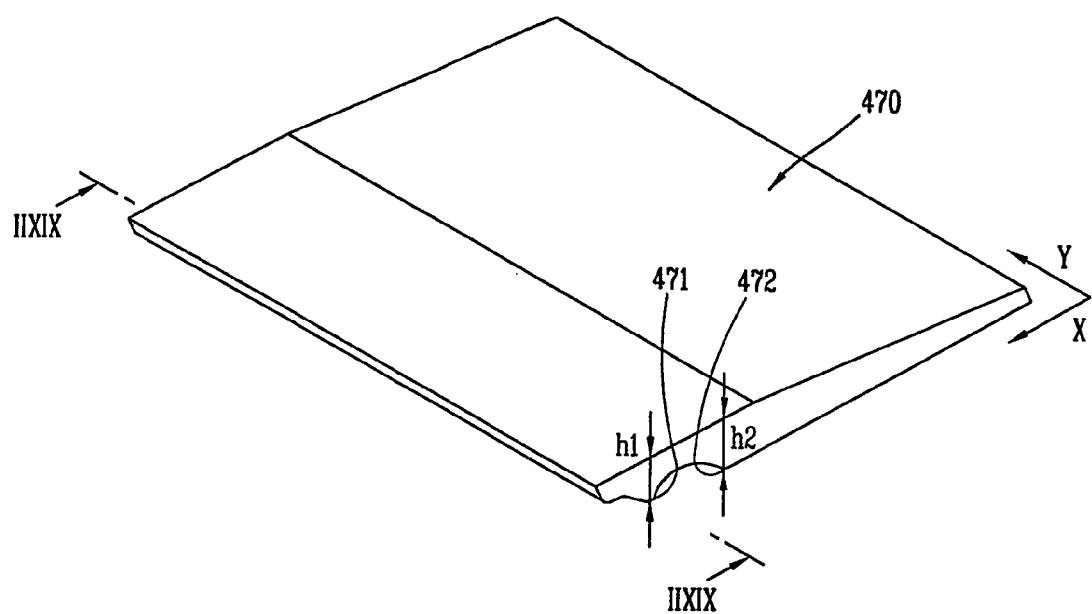
Figure 29:
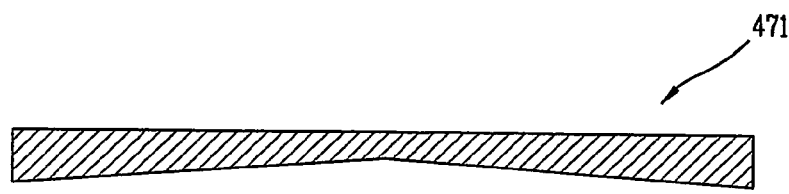

FIGS. 18–29 show an optical disc loading apparatus in accordance with a second embodiment of the present invention; FIG. 18 is a plan view illustrating the optical disc loading apparatus in inserting of a large disc; FIG. 19 is a side view illustrating a large disc cam member in FIG. 18; FIG. 20 is a side view illustrating a small disc cam member in FIG. 18; FIG. 21 is a side view illustrating the optical disc loading apparatus in FIG. 18 when a large disc cam locking protrusion in FIG. 18 is located at a position IIX I; FIG. 22 is a side view illustrating the optical disc loading apparatus in FIG. 18 when the large disc cam locking protrusion in FIG. 19 is located at a position IIX II; FIG. 23 is a side view illustrating the optical disc loading apparatus in FIG. 18 when the large disc cam locking protrusion in FIG. 19 is located at a position IIX III; FIG. 24 is a plan view illustrating the optical disc loading apparatus in inserting of a small disc; FIG. 25 is a side view illustrating the optical disc loading apparatus in FIG. 24 when the small disc cam locking protrusion in FIG. 20 is located at a position IIX V; FIG. 26 is a side view illustrating the optical disc loading apparatus when the small disc in FIG. 24 contacts to a trigger protrusion; FIG. 27 is a side view illustrating the optical disc loading apparatus in FIG. 24 when the small disc cam locking protrusion in FIG. 20 is located at a position IIX VII; FIG. 28 is a perspective view illustrating a disc guide in FIG. 21; FIG. 29 is a sectional view taken along a line IIX IX–II X IX.

As depicted in FIGS. 18–29, the loading apparatus in accordance with the second embodiment of the present invention includes a roller frame 420 hinge-joined with the main frame 11; a main roller 410 rotationally combined with the end of the roller frame 420; a roller driving means 660 for rotating the main roller 410; a sub member 430 installed so as to support the same surface of the inserted optical disc 15 with the main roller 410; a contact-pressing means for contact-pressing the optical disc 15 toward the main roller 410, at least two small disc stopping members 440 formed at the main frame 11 in order to make the inserted small disc 15a mount onto the spindle 14b; at least two large disc stopping members 450 formed at the main frame 11 in order to make the inserted large disc 15b mount onto the spindle 14b; a large disc distinguishing means for distinguishing the inserted large disc 15b; and a roller frame driving means for operating the roller frame 420 in order to make the large disc 15b inserted by the distinguishing means not to be locked in the small disc stopping member 440.

The roller frame 420 includes a main roller arm 420a for combining the main roller 410; a sub member arm 420b formed so as to be opposite to the main roller arm 420a on the basis of the hinge point; and a hinge protrusion 420c formed so as to combine the roller frame 420 with the hinge point 420d.

It is preferable for the sub member 430 to be a sub roller rotationally combined with the end of the sub member arm 420b. However, it is also possible to be constructed as a member for simply supporting the inserted disc 15. It is preferable for the sub roller 430 to be made of cotton flannel.

The main roller arm 420a, the sub member arm 420b are arranged so as to make the hinge point 420d be formed on the straight line of the main roller 410 and the sub roller 430.

The roller driving means 660 includes a driving motor 661 and a gear set 663 connected to a driving shaft 662 of the driving motor 661 and the rotational shaft 411 of the main roller in order to transmit power of the driving motor 661 to the rotational shaft 411.

The contact-pressing means includes a hinge protrusion 670 projected from the disc guide 470 of the main frame 11 so as to make the bottom end surface of the inserted optical disc 15 place at the hinge point 420d of the roller frame in order to make the inserted optical disc 15 contact to the main roller 410 and the sub roller 430; and a roller frame elastic member 480 in which one end is fixed to the roller frame 420, the other end is fixed to the main frame 11 in order to make the main roller 410 contact-press the inserted optical disc 11. Accordingly, when the optical disc is inserted between the sub roller 430, the main roller 410 and the hinge protrusion 670, the main roller 410 can be operated while maintaining a certain contact-pressing force to the optical disc 15.

The disc guide 470 includes two contact ribs 471, 472 facing the main roller 410. As depicted in FIG. 27, in forming of the contact ribs 471, 472, h1 is lower than h2. Because of that, as depicted in FIG. 25, when the disc is inserted between the contact ribs 471, 472 and the main roller 410, the disc can be stably locked by the small disk stopping member 440. However, each height of the contact ribs 471, 472 is determined so as to lock the disc in the small disk stopping member 440. In addition, as depicted in FIGS. 27 and 28, the contact ribs 471, 472 of the disc guide 470 are slant from the center to the both ends in the Y direction in FIG. 27. Because of that, they are contacted to only the outer circumference of the disc by corresponding to the main roller 410 having a hyperboloid shape.

As depicted in FIG. 21, the small disc stopping member 440 is downwardly projected from the top plate of the main frame 11.

In addition, as depicted in FIG. 21, the large disc stopping member 450 is downwardly projected from the top plate of the main frame 11.

The large disc distinguishing means includes a a large disc trigger member 610. The large disc trigger member has trigger protrusion 612 protruded from the large disc trigger member 610; a hinge joining portion 613 which make the large disc trigger member 610 connected to main frame 11; and, a cam pressing portion 614 formed at the opposite end of the trigger protrusion 612 on the basis of the hinge joining potion 613.

The trigger protrusion 612 is formed at the position which can be contacted to the outer circumference of the inserted large disc 15b before contacting to the small disc stopping member 440 and can not contacted to the outer circumference of the inserted small disc 15a.

The roller frame driving means can be constructed as a large disc cam unit 630 operated by the large disc trigger member 610. The large disc cam unit 630 includes a cam member 631 installed movably toward the taking in/out direction of the disc inserted by being contacted to the cam pressing portion 614; a gear hole 636 formed long in the moving direction of the cam member 631; a lack gear 637 formed at the internal bottom surface of the gear hole 636; a pinion 638 engaged with the lack gear 637 when the cam pressing portion 614 moves the cam member 631; a cam driving shaft 639 connected to the pinion 638; a cam driving motor (not shown) for driving the cam driving shaft 639; a locking avoidance cam slant 632 formed at the cam member so as to move the roller frame in order to make the inserted disc 15 not to be locked to the small disc stopping member 440 by moving the cam member 631 with the cam driving motor (not shown); a disc proceeding horizontal plane 633 formed so as to proceed the disc on the locking avoidance cam slant 632; and a cam separation slant 634 extended from the disc proceeding horizontal plane 633 in order to make the main roller 410 separate from the inserted optical disc 15.

In addition, the large disc cam unit 630 includes a locking protrusion 615 projected from the side of the cam member 631 so as be locked in the cam pressing portion 614; a restoring spring 639 at which the end is fixed to the main frame 11, the other end is fixed to the cam member 630 in order to make the cam member return to the initial position when the combination of the lack gear 637 and the pinion 638 is released; and a large disc cam protrusion 421 formed at the side of the roller frame in order to move toward the cam surface of the cam member 631.

In addition, the optical disc loading apparatus in accordnace with the second embodiment of the present invention further includes a small disc trigger member 620 for sensing when the outer circumference of the small disc 15b reaches the small disc stopping member 440; and a small disc cam unit 640 operated by the small disc trigger member 620.

The small disc trigger member 620 includes a trigger protrusion 622 contacted to the outer circumference of the small disc 15a before it reaches the small disc stopping member 440; a hinge joining portion having the trigger protrusion 622 at the end and hinge-joined with the main frame 11; and a cam pressing portion 624 formed at the opposite end of the trigger protrusion 622 on the basis of the hinge joining portion 623.

The small disc cam unit 640 includes a cam member 634 installed movably toward the taking in/out direction of the disc inserted by being contacted to the cam pressing portion 624; a gear hole 646 formed long in the moving direction of the cam member 631; a lack gear 647 formed at the internal bottom surface of the gear hole 646; a pinion 648 engaged with the lack gear 647 when the cam pressing portion 624 moves the cam member 641; a cam driving shaft 639 connected to the pinion 648; a cam driving motor (not shown) for driving the cam driving shaft 639; and a cam separation slant 642 for making the main roller 610 separate from the inserted optical disc 15b according to the moving of the cam member 631 by the cam driving motor (not shown).

In addition, in order to move along the cam surface of the cam member 641, a small disc cam protrusion 422 is formed at the side surface of the roller frame.

Hereinafter, the operation of the apparatus in accordance with the second embodiment of the present invention will be described.

Inserting the large disc 15b will be described.

When the large disc 15b is inserted, the main roller 410 is rotated by the roller driving means 660, and the large disc 15b is inserted into the main frame 11. As depicted in FIG. 18, when the inserted large disc 15b is placed at an I position, it presses the trigger protrusion 612, and the trigger member 611 performs the rotation in the counter-clockwise direction centering around the hinge joining portion 613. According to the rotation of the trigger member 611, the cam pressing portion 614 presses the locking protrusion 615, and accordingly the large disc cam member 631 is moved.

According to the moving of the large disc cam member 631, the lack gear 637 is engaged with the pinion 638, the large disc cam member 631 is continually moved, and accordingly the large disc cam protrusion 421 is moved from the IIX I position to the IIX II position. Accordingly, while the large disc cam protrusion 421 moves along the locking avoidance cam slant 632, the main roller frame 420 is rotated, and the main roller 410 is rotated downwardly as shown in FIG. 22. As depicted in FIG. 22, the large disc 15b is slant by the main roller 410, the sub roller 420 and the hinge protrusion and proceeds continually without being locked by the small disc stopping member 440. Afterward, when the large disc stopping member 450 is locked, the large disc cam protrusion is moved from the IIX II position to the IIX III position along the cam separation slant 634. As depicted in FIG. 23, the main roller 410 is completely separated from the large disc 15*b*, and accordingly the large disc 15*b* is mounted onto the spindle 14*b*.

Inserting the small disc 15*a* will be described.

When the small disc 15*a* is inserted, the main roller 410 is rotated by the roller driving means 660, and the small disc 15*a* is inserted into the main frame 11. When the inserted places at the position shown in FIG. 24, it presses the trigger protrusion 622, and the small disc trigger member 621 performs the rotation in the clockwise direction centering around the hinge joining portion 623. According to the rotation of the trigger member 621, the cam pressing portion 624 presses the locking protrusion 625, and the small disc cam member 641 is moved.

According to the moving of the small disc cam member 641, as depicted in FIG. 20, the lack gear 647 is engaged with the pinion 648, the small disc cam member 641 moves continually, and the small disc cam protrusion 422 passes the cam separation slant 642. Accordingly, as depicted in FIG. 27, the main roller 410 is completely separated from the small disc 15*a*, and the small disc 15*a* is mounted onto the spindle.

As described above, because the second embodiment of the present invention is capable of distinguishing and mounting a different-sized disc with a simple structure, it is possible to reduce a fabrication cost, simplify the operation and improve the operation reliability.

In addition, because the sub roller is made of cotton flannel, impurities on the surface of the optical disc can be removed.

Figure 30:
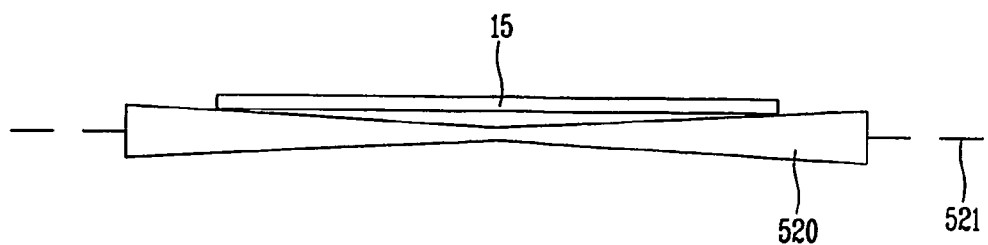
FIG. 30 is a front view illustrating a modified example of a sub roller in accordance with the second embodiment of the present invention.

FIG. 30 is a front view illustrating a modified example of a sub roller in accordance with the second embodiment of the present invention.

In the sub roller 520, the rotational shaft 421 is rotationally combined with the roller frame 420, and it has a hyperboloid shape.

Accordingly, when the sub roller 520 contacts to the optical disc 15, because it can contact only to the outer end of the optical disc 15, damage occurrable onto the data recording surface of the optical disc 15 can be minimized.

Figure 31:
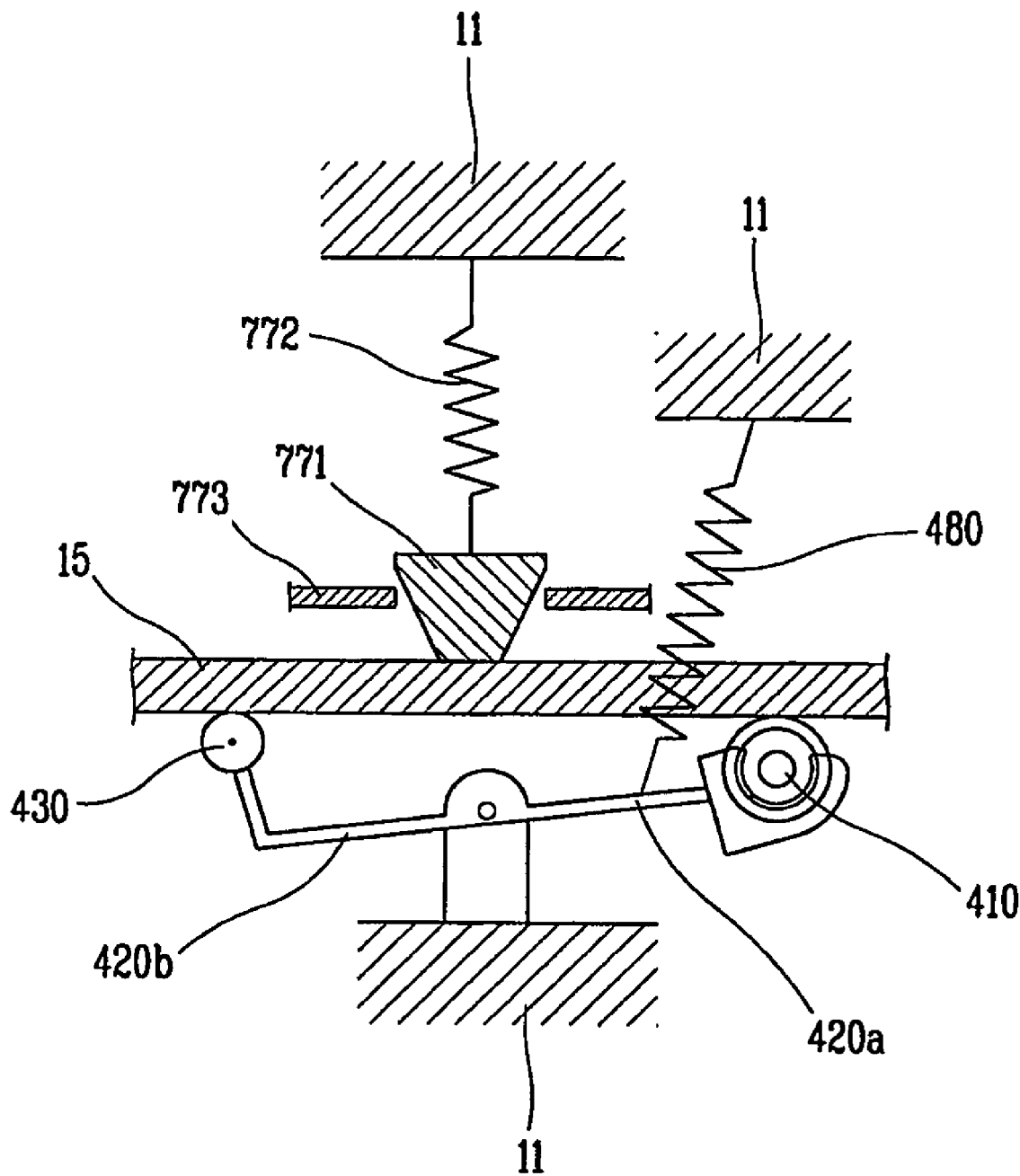
FIG. 31 is a conceptual view illustrating a modified example of a contact-pressing means in accordance with the second embodiment of the present invention.

FIG. 31 is a conceptual view illustrating a modified example of a contact-pressing means in accordance with the second embodiment of the present invention.

The contact-pressing means includes a contact-pressing member 771; a contact-pressing elastic member 772 at which the end is fixed to the contact-pressing member 771, the other end is fixed to the main frame 11 in order to press the inserted optical disc 15 toward the main roller 410 and the sub member 430; and a separation preventive member 773 at which the end is fixed to the roller frame 420, the other end is fixed to the main frame 11 in order to prevent the main roller 410 separate from the roller frame elastic member 480 and the contact-pressing member 771 contact-pressing the inserted optical disc 15.

As described above, because the contact-pressing member 771 contacts the inserted optical disc 15 to the main roller 410 with a certain contact-pressing force, the main roller 410 can efficiently move the optical disc 15.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

INDUSTRIAL APPLICABILITY

As described above, the present invention can have various advantageous.

First, the present invention is capable of distinguishing a size of a disc and changing a disc moving path according to the size of the disc inserted into an optical disc player with a simple structure, and accordingly it is possible to reduce a production cost.

By simplifying the structure, noise occurrable in operation of the apparatus in the disc loading can be sharply reduced.

In addition, by simplifying a disk loading operation, operational reliability can be improved.

In addition, by using a sub roller made of cotton flannel, impurities on the surface of an optical disc can be removed.

The invention claimed is:

1. An optical disc loading apparatus, comprising:
  a main roller installed at an inlet side of an optical disc drive in order to take in/out an optical disc;
  a disc guide installed in the opposite direction of the main roller with an inserted disc therebetween;
  a disc path control member installed between the main roller and the inlet side of the drive;
  a small disc stopping member formed at the drive in order to make an inserted small disc stop at a position mountable onto a spindle; and
  a large disc stopping member formed at the drive in order to make an inserted large disc stop at a position mountable onto a spindle;
  wherein the disc path control member is formed so that an inserted disc contacting to the main roller, the disc guide and the path control member simultaneously has a proceeding direction different from that of an inserted disc contacting to the main roller, the disc guide simultaneously;
  the small disc stopping member has a certain height in order to stop a disc proceeding while simultaneously contacting to the main roller and the disc guide, and in order not to stop a disc proceeding while simultaneously contacting-to the main roller, the disc guide and the path control member; and
  the large disc stopping member has a certain height in order to lock a disc proceeding while simultaneously contacting to the main roller, the disc guide and the path control member.

2. The apparatus of claim 1, wherein the disc path control member has a sub roller installed at the end contacting to an inserted disc.

3. The apparatus of claim 2, wherein the sub roller has a hyperboloid shape so as to contact only with the outer circumference of an optical disc.

4. The apparatus of claim 1, further comprising:
  a roller frame, at which the main roller is hinge-joined at the end and the disc path control member is formed at the other end, rotationally hinge-joined with the main frame of the optical disc drive.

5. The apparatus of claim 4, further comprising:
  a contact-pressing spring at which the end is fixed to the main frame of the optical disc drive and the other end is fixed to the roller frame in order to make the main roller act a contact-pressing force on an inserted disc.

6. The apparatus of claim 4, wherein the end of the roller frame at which the disc path control member is installed is bended in order to close the drive inlet when the main roller is separated from an inserted disc.

7. The apparatus of claim 1, wherein the disc path control member includes a cleaning means at a surface contacted to an inserted disc.

8. The apparatus of claim 7, wherein the cleaning means is made of cotton flannel.

9. The apparatus of claim 1, wherein the disc guide includes two disc contact ribs vertically long at right angles to a proceeding direction of an optical disc.

10. The apparatus of claim 9, wherein each contact rib has a different height in order to make an inserted optical disc be stopped completely in the small disc stopping member.

11. The apparatus of claim 1, wherein the disc path control member is elastically combined with the main frame.

12. The apparatus of claim 1, wherein the disc path control member comprises two torsion spring installed at both sides of main frame with its bodies facing each other.

13. An optical disc loading apparatus, comprising:
a roller frame hinge-joined with a main frame;
a main roller rotationally connected with the end of the roller frame;
a roller driving means for rotating the main roller;
a sub member installed so as to support the same surface of an inserted optical disc with the main roller;
a contact-pressing means for pressing the optical disc toward the main roller in order to make the inserted optical disc contact to the main roller with a contact-pressing force;
a small disc stopping member formed at the main frame contacted to the outer circumference of an inserted small disc in order to stop the inserted small disc at a position mountable onto a spindle;
a large disc stopping member formed at the main frame contacted to the outer circumference of an inserted large disc in order to stop the inserted large disc at a position mountable onto a spindle;
a large disc distinguishing means for distinguishing an inserted large disc; and
a roller frame driving means for rotating the roller frame in order to make the large disc inserted by the distinguishing means not to be stopped in the small disc stopping member.

14. The apparatus of claim 13, wherein the sub member is a sub roller.

15. The apparatus of claim 14, wherein the sub roller has a hyperboloid shape so as to be contacted only with the outer circumference of an optical disc.

16. The apparatus of claim 13, wherein the roller frame includes:
a main roller arm connected with the main roller; and
a sub member arm formed at the opposite end of the main roller arm and having the sub member;
wherein the main roller arm and the sub member arm are formed so that the hinge point of the roller frame is on a straight line of the top surfaces of the main roller and the sub member.

17. The apparatus of claim 16, wherein the contact-pressing means includes:
a hinge protrusion projected from the main frame, at which the bottom end thereof is placed at the hinge point of the roller frame, in order to contact-press the inserted optical disc toward the main roller and the sub member; and
a roller frame elastic member, at which the end is fixed to the roller frame and the other end is fixed to the mainframe, for contact-pressing the main roller-inserted optical disc.

18. The apparatus of claim 13, wherein the contact-pressing means includes:
a contact pressing member;
a contact-pressing elastic member, at which the end is fixed to the contact-pressing member and the other end is fixed to the main frame, for pressing the inserted optical disc toward the main roller and the sub member; and
a roller frame elastic member, at which the end is fixed to the roller frame and the other end is fixed to the main frame, for making the main roller contact-press the optical disc toward the contact-pressing member.

19. The apparatus of claim 13, wherein the sub member includes a cleaning means at a surface contacted to an inserted disc.

20. The apparatus of claim 19, wherein the cleaning means is made of cotton flannel.

21. The apparatus of claim 13, wherein the large disc distinguishing means includes a large disc trigger member having:
a trigger protrusion installed so as to contact with the outer circumference of an inserted large disc before it contacts to the small disc stopping member, and so as not to contact to the outer circumference of an inserted small disc; and
the trigger protrusion at the end, a hinge joining portion hinge-joined with the main frame and a cam pressing portion formed at the other end opposite to the trigger protrusion with the hinge joining portion therebetween.

22. The apparatus of claim 21, wherein the roller frame driving means includes:
a large disc cam member installed so as to move toward a taking in/out direction of an inserted disc by being contacted to the cam pressing portion;
a lack gear formed long at the large disc cam member in the moving direction of the large disc cam member;
a pinion formed so as to be engaged with the lack gear when the cam pressing portion moves the large disc cam member;
a driving motor for driving the pinion;
a locking avoidance cam slant for moving the roller frame in order to make the inserted optical disc not be locked in the small disc stopping member when the large disc cam member is moved by the driving motor;
a cam separation slant extended-formed at the locking avoidance cam slant in order to make the main roller be separated from the optical disc; and
a large disc cam protrusion formed at the side surface of the roller frame so as to be movable along the cam slant.

* * * * *